United States Patent
Charkhutian et al.

(10) Patent No.: US 6,797,177 B2
(45) Date of Patent: Sep. 28, 2004

(54) PROCESS FOR INHIBITING SCALE AND FOULING ON THE METAL SURFACES EXPOSED TO AN AQEUOUS SYSTEM

(75) Inventors: Kostan B. Charkhutian, Westwood, NJ (US); Bruce L. Libutti, Teaneck, NJ (US); Frank L. M. De Cordt, Ranst (BE); John S. Ruffini, Mount Arlington, NJ (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/198,781

(22) Filed: Jul. 18, 2002

(65) Prior Publication Data

US 2004/0011743 A1 Jan. 22, 2004

(51) Int. Cl.$^7$ ................................................. C02F 5/12
(52) U.S. Cl. ...................... 210/698; 210/701; 252/180; 422/16
(58) Field of Search ............................... 210/698–701; 252/180, 181; 422/16

(56) References Cited

U.S. PATENT DOCUMENTS

| | | | | |
|---|---|---|---|---|
| 4,454,046 A | * | 6/1984 | Wallace et al. ............. | 210/698 |
| 4,885,136 A | * | 12/1989 | Katayama et al. ............ | 422/15 |
| 5,350,536 A | * | 9/1994 | Chen et al. .................. | 252/180 |
| 6,034,046 A | * | 3/2000 | Blanvalet et al. ........... | 510/362 |
| 6,096,701 A | * | 8/2000 | Mondin et al. .............. | 510/382 |
| 6,103,686 A | * | 8/2000 | Asakawa et al. ........... | 510/479 |
| 6,362,148 B1 | * | 3/2002 | Durbut et al. .............. | 510/238 |

OTHER PUBLICATIONS

Product literature on NERVANAID GBS5 sequestering agent supplied by Contract Chemicals, Publication Date: Sep. 28, 1998.

* cited by examiner

Primary Examiner—Peter A. Hruskoci
(74) Attorney, Agent, or Firm—David L. Hedden

(57) ABSTRACT

This invention relates to a process for inhibiting scale and fouling on metal surfaces exposed to an aqueous system, particularly a circulating aqueous system. The process comprises adding glutamic acid N,N diacetic acid, or salts thereof, to the aqueous system. Glutamic acid N,N diacetic acid, or salts thereof, act as a chelating agent and is biodegradable. The process is particularly useful for inhibiting the formation of scale and fouling on metal surfaces of steam generating and cooling systems.

7 Claims, No Drawings

PROCESS FOR INHIBITING SCALE AND FOULING ON THE METAL SURFACES EXPOSED TO AN AQEUOUS SYSTEM

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to a process for inhibiting scale and fouling on metal surfaces exposed to an aqueous system, particularly a circulating aqueous system. The process comprises adding glutamic acid N,N diacetic acid, or salts thereof, to the aqueous system. Glutamic acid N,N diacetic acid, or salts thereof, act as a chelating agent and is biodegradable. The process is particularly useful for inhibiting the formation of scale and fouling on metal surfaces of steam generating and cooling systems.

(2) Description of the Related Art

Divalent and trivalent cations, e.g. calcium, magnesium, iron and copper, are often found in the water, which circulates in various heating and cooling systems, for example chillers, boilers, and process heat exchangers. Typically, the heating and cooling system is comprised of components or equipment made of metal such as iron, steel, aluminum, etc. The divalent and trivalent metal cations often form a precipitate in the presence of anions, e.g. sulfate, carbonate, silicate, and hydroxide found in the water and form scale on the metal surfaces of the parts of the heating and cooling system.

It is known to add salts of ethylenediaminetetraacetic acid (EDTA) and nitrilotriacetic acid (NTA) to the water circulating through heating and cooling systems. These salts react with the divalent and trivalent cations to form soluble, thermally stable complexes, which reduce or eliminate the formation of scale and fouling on the metal surface of the metal components and equipment used in the heating and cooling systems. In steam generating systems, the complexed cations include calcium, magnesium, iron and copper.

There are problems with using the salts of ethylenediaminetetraacetic acid (EDTA) and nitrilotriacetic acid (NTA) in aqueous systems to chelate metal cations. Regulations in Europe require that the blowdown of boiler water must contain materials that are readily biodegradable. Thus, EDTA is not acceptable since it is not biodegradable. Although NTA is biodegradable, it is classified as a carcinogen in the United States.

There is an interest in discovering biodegradable materials that are thermally stable, yet have anti-precipitation capabilities comparable to EDTA, when used in a heating or cooling system where the circulating water contains calcium, magnesium and/or iron cations.

It is known that from the product literature of Contract Chemicals that NERVANAID GBS5, which contains glutamic acid N,N diacetic acid tetrasodium salt as an active ingredient, is a biodegradeable sequestering agent for household and industrial and institutional detergents.

All citations referred to under this description of the "Related Art" and in the "Detailed Description of the Invention" are expressly incorporated by reference.

BRIEF SUMMARY OF THE INVENTION

This invention relates to a process for inhibiting scale and fouling on metal surfaces exposed to an aqueous system, particularly a circulating aqueous system. The process comprises adding glutamic acid N,N diacetic acid, and salts thereof (e.g. the tetrasodium salt), to the aqueous system. Preferably used is glutamic acid N,N diacetic acid tetrasodium salt, which acts as a chelating agent. It chelates metal cations, particularly calcium, magnesium, and, to a lesser extent, iron. The process is particularly useful for inhibiting the formation of scale on metal surfaces of industrial, commercial and institutional water systems, particularly boilers operating at temperatures of 120° C. to 270° C., and moderate pressures, up to 750 psig (50 bar).

The glutamic acid N,N diacetic acid tetrasodium salt is biodegradable and exhibits thermal stability when present with cations. The anti-precipitation capabilities are similar to EDTA with respect to calcium and/or magnesium cations. Thus, glutamic acid N,N diacetic acid tetrasodium salt could replace EDTA.Na$_4$ as a chelant in aqueous systems. Experiments suggest that glutamic acid N,N diacetic acid tetrasodium salt is more effective in chelating calcium cations (whether the calcium cations are present alone or in combination with magnesium and/or iron cations) and in inhibiting calcium scale in aqueous systems circulating through boilers made of steel than EDTA.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed.

Preferably used is glutamic acid N,N-diacetic acid tetrasodium salt is represented by the following structural formula:

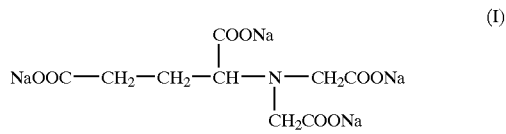

The glutamic acid N,N-diacetic acid tetrasodium salt is added to an aqueous system such as cooling water, boiler water, reverse osmosis and geothermal/mining water in amounts from 1 to 500 ppm, but preferably from 10 to 50 ppm.

The process is particularly useful for aqueous systems circulating through boilers made of steel, although the process is useful for aqueous systems circulating through equipment made of other metals, e.g. iron, aluminum, brass, copper, and alloys thereof.

The glutamic acid N,N-diacetic acid, or salt thereof, may be combined with other components used in scale inhibitor compositions, e.g. corrosion inhibitors, surfactants, dispersants, precipitants, antifoams or agents that inhibit microbiological growth.

Abbreviations

| | |
|---|---|
| GATS | glutamic acid N,N-diacetic acid tetrasodium salt, as a 38% minimum solution of glutamic acid N,N-diacetic tetrasodium salt in water, sold under the tradename DISSOLVINE GL-38 by Akzo Nobel (formally NERVANAID GBS-5 by Contract Chemicals). |
| BWT A | BWT A (boiler water treatment) contains 13% GATS, 4% acrylic dispersants 1.3% NaOH, 1.25% sodium erythorbate, and balance is water. |

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

Several solutions based on BWT A were prepared. The formulations are set forth as follows:

| | | |
|---|---|---|
| 1. | Without cations: | 1100 ppm BWT A that contained GATS without cations. |
| 2. | Calcium cation only: | 1650 ppm BWT A that contained GATS with 43 ppm calcium (as $CaCO_3$). |
| 3. | Magnesium cation only: | 7700 ppm BWT A that contained GATS with 252 ppm magnesium (as $CaCO_3$). |
| 4. | Iron cation only: | 1100 ppm BWT A that contained GATS with 16 ppm iron (as Fe). |
| 5. | All three cations: | 10450 ppm BWT A that contained GATS with 43 ppm calcium (as $CaCO_3$), 252 ppm magnesium (as $CaCO_3$) and 16 ppm iron (as Fe). |

The solutions were prepared by mixing the components. The mixtures were autoclaved for three hours at 420° F./216° C. (300 psig/~21 bar) in one case and 456° F./235° C. (450 psig/~31 bar) in another case to determine effectiveness of using GATS at different pressures and temperatures.

High levels of calcium and magnesium were used due to the solubility limits of their carbonate and hydroxide respectively. All solutions were adjusted to pH: 9.95–10.05 using diluted caustic soda.

The autoclaved samples were analyzed for calcium, magnesium, and iron analysis using ICP. ICP is Inductively Coupled Plasma. Thermal stability was measured by colorimetric titration using bismuth as a titrant. Complexing ability was measured by determination of metal ions retained in solution by ICP. Filtration was done using 0.45-micron filters. Filtration was done before samples were submitted for thermal stability and complexing ability testing. Filtration was done to remove the uncomplexed cations, which precipitated, and the measure of success was determined on the amount materials held in solution.

TABLE I (TOTAL CHELANT THERMAL STABILITY GATS AT DIFFERENT PRESSURES/TEMPERATURES)

| Cation(s) | Pressure/Temperature | |
|---|---|---|
| in solution | 300 psig (~21 bar)/216° C. | 450 psig (~31 bar)/235° C. |
| no cations | unstable | unstable |
| calcium only | ~28% survived | ~25% survived |
| magnesium only | ~51% survived | ~32% survived |
| iron only | INTR[1] | INTR[1] |
| all three cations | ~51% survived | ~23% survived |

[1]Unable to analyze due to interference by iron.

The data in Table I show how much of the GATS survived after it was subjected to the pressures and temperatures set forth in Table I. Higher percentages of survival indicate that the GATS was more thermally stable.

The data indicate that GATS had some thermal stability in the presence of the cations. The data further indicate that thermal stability is better in solutions that contained magnesium cations than calcium cations. The data further suggest that the thermal stability decreased at higher pressure and temperature[2].

[2]Softeners and de-mineralizers leak magnesium into the boiler feedwater before they leak calcium or iron.

TABLE II (ANTIPRECIPITATION EFFECT OF GATS AT DIFFERENT PRESSURES)

| Cation(s) | Pressure/Temperature | |
|---|---|---|
| in solution | 300 psig (~21 bar)/216° C. | 450 psig (~31 bar)/235° C. |
| Calcium only | ~91% remained | ~97% remained |
| Magnesium only | almost 100% remained | ~86% remained |
| Iron only | ~72% remained | ~10% remained |
| All three cations | | |
| Calcium | ~93% remained | ~90% remained |
| Magnesium | ~90% remained | ~73% remained |
| Iron | ~54% remained | ~22% remained |

The higher the percentage of cations remaining in solution, the better the complexing agent, because the cations are not as likely to form scale on metal surfaces if they remain in solution. The data indicate that GATS complexes at least a portion of all the cations tested at lower and higher pressures and temperatures. However, the data further indicate that GATS is generally more effective at complexing the cations at lower pressures and temperatures than higher pressures and temperatures.

The data further indicate that GATS is more effective in complexing calcium and magnesium than iron. However, at lower pressures and temperatures, the data suggest that GATS is more effective in complexing magnesium cations, while at higher pressures and temperatures, GATS is more effective in complexing calcium cations.

What is claimed is:

1. A process for inhibiting scale formation and fouling on a metal surface in an aqueous boiler water system including cations selected from the group consisting of calcium, magnesium, iron and mixtures thereof, which comprises adding an effective scale inhibiting amount of a composition comprising a compound selected from the group consisting of glutamic acid N,N diacetic acid, and salts thereof, to an aqueous system to which said metal surface is exposed, to chelate said cations.

2. The process in claim 1 where said compound is the tetrasodium salt of glutamic acid N,N diacetic acid.

3. The process of claim 1 wherein the metal surface of the boiler is steel.

4. The process of claim 3 wherein the boiler operates at a temperature of at least 120° C. and a pressure up to 750 psig.

5. The process of claim 4 wherein the cation is magnesium.

6. The process of claim 1, 2, 3, 4, or 5 wherein the concentration of said compound is from 1 ppm to 500 ppm.

7. The process of claim 6 wherein the concentration of said compound is from 10 ppm to 50 ppm.

* * * * *